J. J. JOHNSTON.
Seed-Planter.

No. 20,158.

Patented May 4, 1858.

UNITED STATES PATENT OFFICE.

JAS. J. JOHNSTON, OF ALLEGHENY CITY, PENNSYLVANIA.

IMPROVEMENT IN SEED-PLANTERS.

Specification forming part of Letters Patent No. 20,158, dated May 4, 1858.

*To all whom it may concern:*

Be it known that I, JAMES J. JOHNSTON, of the city and county of Allegheny, in the State of Pennsylvania, have invented certain new and useful Improvements in Seed-Planters; and I do hereby declare that the following is a full and exact description thereof, reference being had to the accompanying drawings, and to letters of reference marked thereon, similar letters referring to similar parts.

The nature of my invention consists in an arrangement for lifting up and lowering down the share of the planter and cutting off the seed from the seed-chambers, and also in an arrangement of flexible bottoms in the seed-chambers.

To enable others skilled in the art to make and use my invention, I will proceed to describe its construction and operation.

Figure 4:
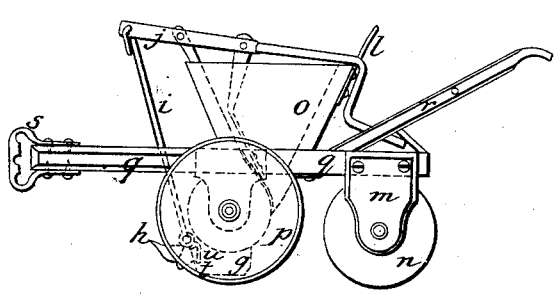
Figure 3:
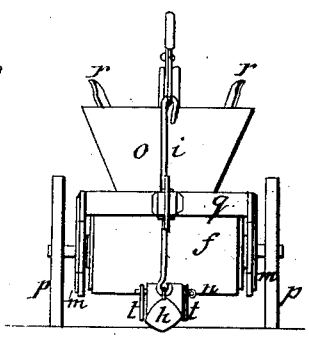
Figure 1:
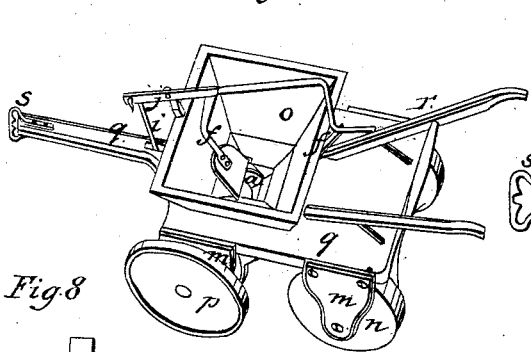
Figure 2:
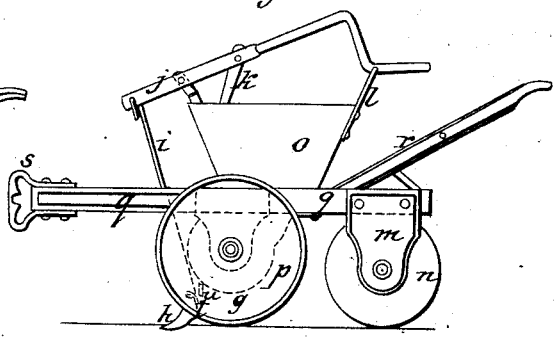
Figure 8:
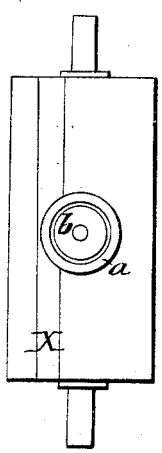
Figure 7:
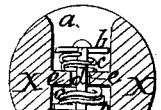
Figure 6:
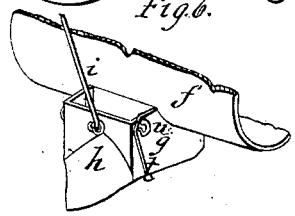
Figure 5:
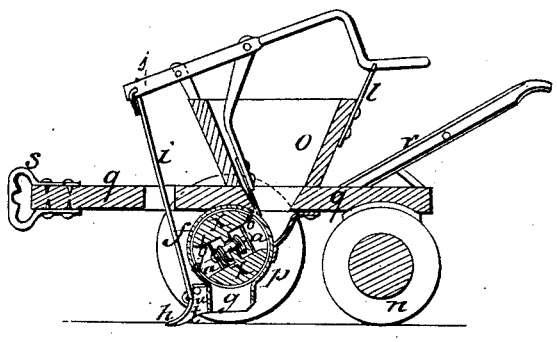

In the accompanying drawings, Figure 1 is a perspective view of the planter. Fig. 2 is a side view of the planter, and represents the share lowered down. Fig. 3 is an end view of the planter. Fig. 4 is a side view of the planter, and represents the share raised up and the seed-chambers closed. Fig. 5 is a sectional view lengthwise of the planter. Fig. 6 represents the share and a broken section of the cylinder in which the axle or drum revolves which contains the seed-chambers. Fig. 7 is a sectional view of the axle or drum which contains the seed-chambers. Fig. 8 is a top view of the axle or drum which contains the seed-chambers.

In the accompanying drawings, $x$ is the axle or drum which contains the seed-chambers $a$. To the axle or drum $x$ is attached the front wheels, $p$. $b$ is the flexible bottom. The bottom $b$ of each seed-chamber is secured to a rod, $d$, which passes through a division-piece, $e$. The flexible bottom is held up to its place by a coil-spring, $c$, which is placed around the rod $d$, and between the flexible bottom $b$ and the division-piece $e$. The axle or drum $x$ is revolved in the cylinder $f$ by means of wheels $p$. By this arrangement of the axle or drum $x$, cylinder $f$, bottoms $b$, rod $d$, springs $c$, and division-piece $e$, one chamber, in receiving seed, causes the other chamber to deposit the seed in it into the depositing-tube $g$. The cylinder $f$ is attached to the frame $q$, and to the cylinder $f$ is attached the depositing-tube $g$.

To the depositing-tube $g$ are attached two lugs, $t$. The share $h$ is held to the lugs $t$ by a rod, $u$. The share $h$ is so constructed that the full force thrown on it will be thrown from the share to the rod $u$ and depositing tube $g$.

To the share $h$ is attached a rod, $i$. This rod $i$ is connected to a lever, $j$. To the lever $j$ is attached also a sliding gate, $k$. The sliding gate $k$ is used for the purpose of cutting off the seed from the seed-chambers $a$. By means of this arrangement the share $h$ can be raised so as to be made inoperative, and the seed is cut off from the chambers $a$, making them also inoperative. Thus the share $h$ and seed-chambers $a$ are made operative or inoperative simply by raising or lowering the lever $j$, which can be done with ease by the operator when between the handles $r$ of the planter.

$o$ is the hopper.

$s$ is the clevis.

$n$ is a roller used for the purpose of pressing the earth over the seed.

$l$ is a strip which is secured to the back end of the hopper $o$, and is used for the purpose of holding up the lever $j$.

$m$ are the pedestals of frame $q$. In these pedestals are placed the journal-boxes for the axle or drum $x$ and roller $n$.

Having thus described the nature, construction, and operation of my improvements in seed-planters, what I claim as of my invention, and desire to secure by Letters Patent of the United States, is—

1. The arrangement of the flexible bottoms $b$, springs $c$, rod $d$, and division-piece $e$ in the seed-chambers $a$, as herein described, and for the purpose set forth.

2. The arrangement of the depositing-tube $g$, with lugs $t$, share $h$, rod $i$, lever $j$, and sliding gate $k$, as herein described, and for the purpose set forth.

JAMES J. JOHNSTON.

Witnesses:
 D. T. DYSON,
 GEORGE P. STECK.